United States Patent [19]

Craig

[11] 4,148,224
[45] Apr. 10, 1979

[54] BELT ADJUSTER BOX STYLE

[75] Inventor: Kenneth K. Craig, Riverside, Calif.

[73] Assignee: H. Koch & Sons Division, Gulf & Western Manufacturing Company, Anaheim, Calif.

[21] Appl. No.: 819,581

[22] Filed: Jul. 27, 1977

[51] Int. Cl.² .................. F16H 7/08; F16G 11/00; A44B 11/12
[52] U.S. Cl. ................... 74/242.8; 24/134 R; 24/191
[58] Field of Search ............. 24/191, 170, 134 P, 24/134 R; 74/242.8, 242.9, 568 FS

[56] References Cited
U.S. PATENT DOCUMENTS

| | | | |
|---|---|---|---|
| 3,818,548 | 6/1974 | Meyerson | 24/191 X |
| 3,872,550 | 3/1975 | Yang | 24/170 |
| 4,051,743 | 10/1977 | Gaylord | 74/242.8 |

Primary Examiner—Leonard H. Gerin
Attorney, Agent, or Firm—George B. White

[57] ABSTRACT

This box type belt adjuster includes a box open at least at one end so as to form a passage therein for a belt or other webbing around a cam which latter is supported on a transverse shaft in the box. A snap-on cap covers the inner end of the passage and encloses a space for a yoke engaging the cam for turning it in the passage. The height of the passage and the distance between the risers of the cam are so related that when the cam is turned to move the risers toward the opposite top and bottom of the passage the clearance is slightly less than the thickness of the belt or webbing whereby when the cam is so turned the belt is jammed between the top and bottom of the passage and the risers of the cam. A manipulating extension extends from the lever to the outside of the cap for turning the cam in a direction to increase the clearance between the risers and the respective sides of the passage. The side walls of the body of the adjuster have ears extended beyond the cap and a transverse rib between them is adapted to accommodate another webbing. The cam is self centering on said shaft through an oblong axial hole therethrough.

7 Claims, 6 Drawing Figures

BELT ADJUSTER BOX STYLE

BACKGROUND OF THE INVENTION

The herein invention is an improvement on the co-pending application of John A. Gaylord, Ser. No. 695,077 filed June 11, 1976, now U.S. Pat. No. 4,051,743.

The primary object of the invention is to provide a device of simple structure which can be easily manufactured and into which a belt can be quickly threaded and thereafter the belt can be adjusted with the minimum effort for clamping the belt in adjusted position or releasing the risers to permit adjustment, and wherein inadvertent release of the cam by body movement is obviated.

DETAILED DESCRIPTION

Figure 2:
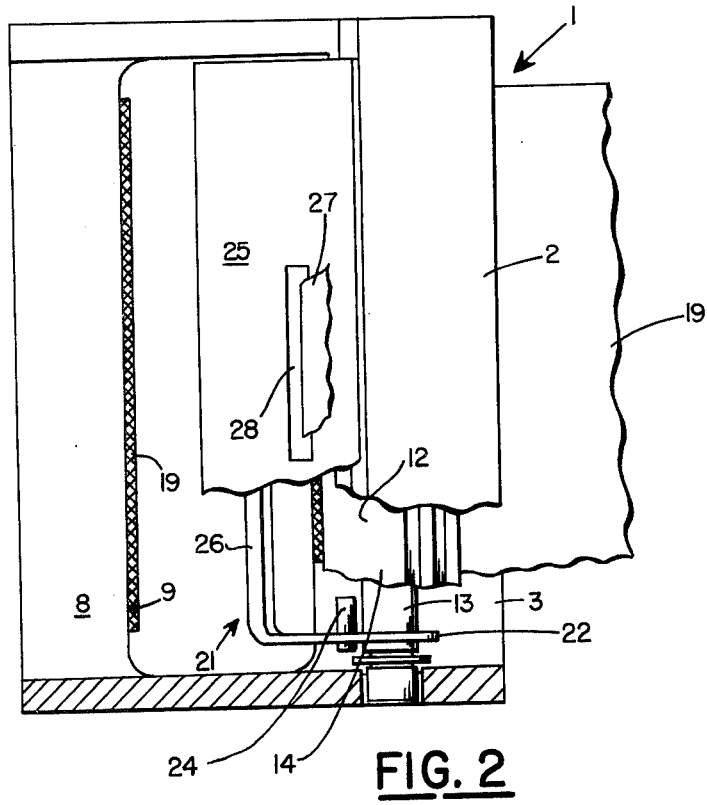
FIG. 2 is a plan view of the device.
Figure 3:
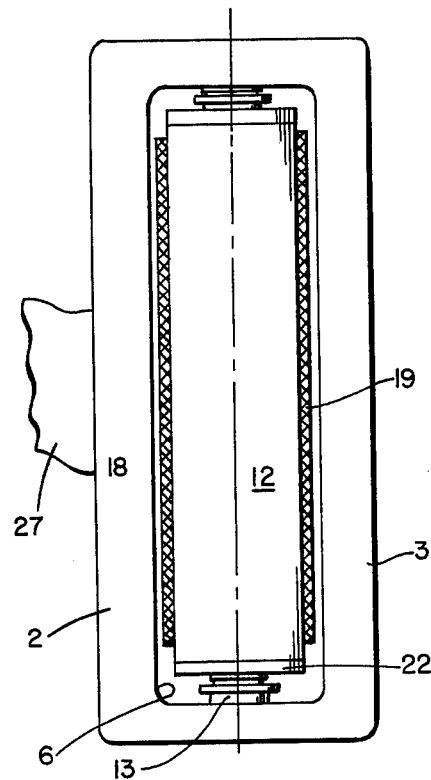
FIG. 3 is an end view of FIG. 2.

The adjuster has an elongated body 1 with a top 2, bottom 3 and side walls 4 which form an elongated passage 6. A pair of parallel connecting ears 7 extend from the ends 4 in line therewith. A transverse connecting rib 8 connects the free ends of the ears 7, the inner edge 11 of which is rounded so that a webbing 11 can be placed around it.

Figure 1:
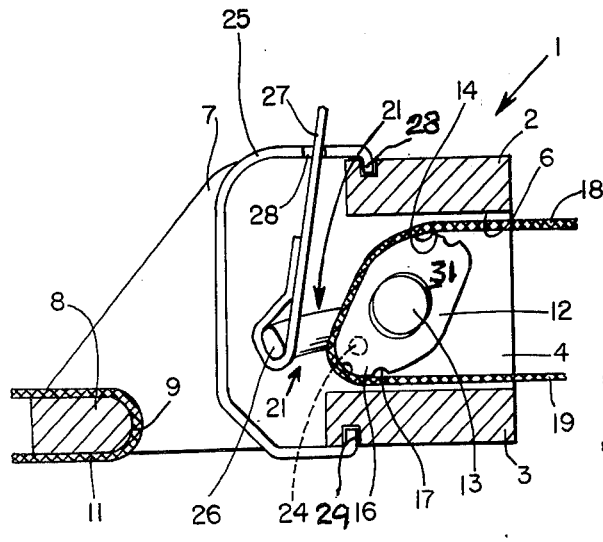
FIG. 1 is a cross-sectional view of the device showing the webbing released.
Figure 4:
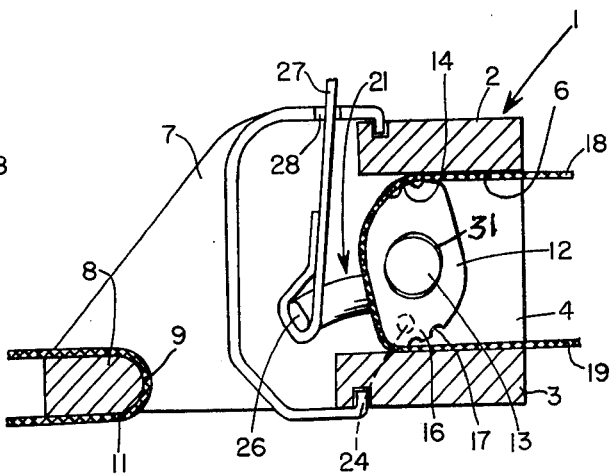
FIG. 4 is a cross-sectional view showing the webbing clamped.
Figure 5:
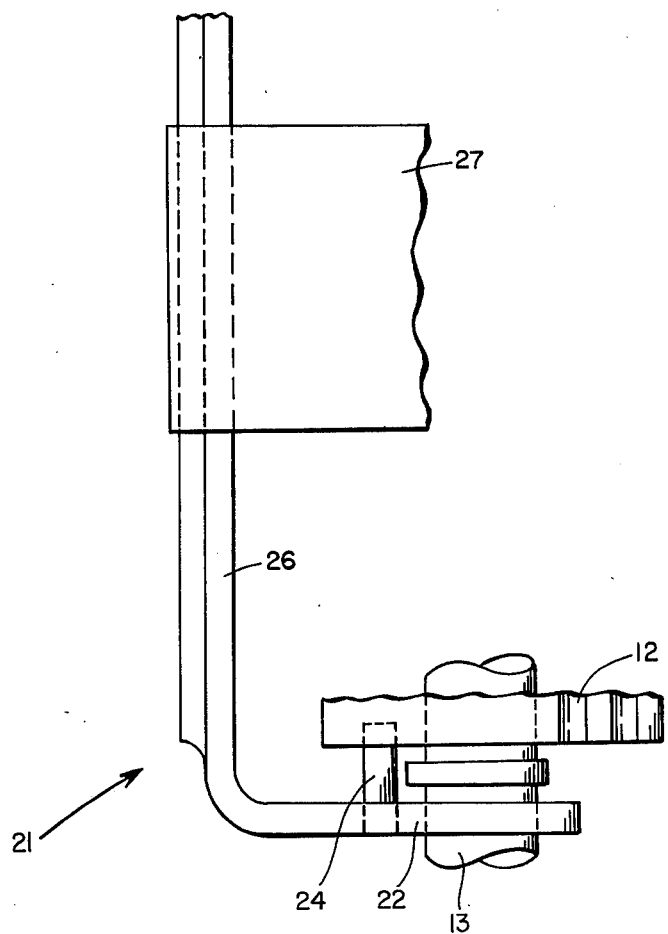
FIG. 5 is a fragmental detail view illustrating the connection of the manipulating yoke to the cam.
Figure 6:
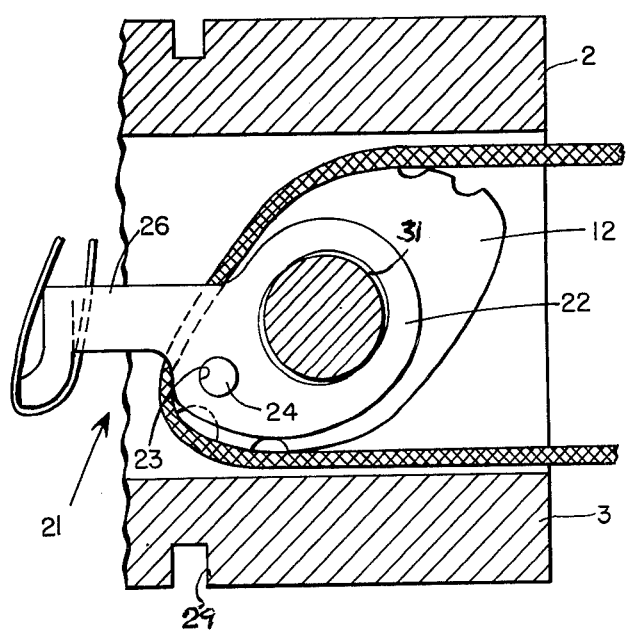
FIG. 6 is a fragmental view on a larger scale showing the self adjusting feature.

An elongated cam 12 is located longitudinally in the passage 4, on a shaft 13 which is supported loosely in holes in the opposite ends 4 of the box body 1. The distance between the risers 14 of the cam 12 is such that when the cam 12 is turned in a contra-clockwise direction, viewing FIG. 1, the risers 14 approach respectively the top and bottom of the passage 6. The risers 14 of the cam 12, in this illustrative form, are provided with ridges 16 formed by parallel grooves 17.

A belt 18 is played around the cam 12. When the branch 19 of the belt 18 is subjected to a pull the force so exerted turns the cam 12 so that the risers 14 approach top and bottom of the passage 6 and clamp the belt 18 and the branch 19 against said top and bottom, thereby clamping the belt webbing 18 in adjusted position as long as the lower branch 19 is under tension.

A manipulating yoke 21 has its legs journalled on the shaft 13 between the respective ends of the cam 12 and the adjacent ends 4 of the passage 6. The hub 22 on each leg of the yoke 21 has a hole 23 therein spaced from the shaft 13 to accomodate a pin 24 which enters the respective adjacent end of the cam 12, thereby to rock the cam 12 whenever the yoke 21 is rocked.

A cap 25 covers the inner end of the passage 4 and forms a chamber to accomodate the yoke 21. On the handle bar 26 of the yoke 21 is a manipulating member in the present form a strap 27, which extends through a slot 28 through the top of the cap 25. This cap 25 closes the passage 4 beyond the yoke 21 between the ears 7. By pulling the strap 27 the cam 12 is turned in clockwise direction viewing FIG. 1 thereby moves the cam risers 14 away from the respective top and bottom of the passage 4 and thereby relieves the belt for adjustment. The cap 25 is sufficiently resilient to be adapted to be snapped in place. Flanges 28 along the open edges of the cap 25 snap into grooves 29 in the outside of the top 2 and bottom 3 parallel with the cam 12.

The axial hole 31 in the cam 12 and the corresponding hole 32 in the legs 22 of the yoke 21 are elongated or oval so that the cam 12 is capable of aligning itself to the natural force balance center when the gripping surfaces of its risers squeeze into the webbing. This enables the cam to adjust to fabrics of different thicknesses, and obviates the need for exact centering of the cam within the adjuster body.

I claim:

1. In a box style belt adjuster
    an elongated box having a top, a bottom and end walls and having a passage therethrough to accommodate a belt,
    a pivot shaft held in the end walls of the box
    a cam on the pivot shaft within the box,
    risers on the cam being spaced to a distance to provide between said risers and the respective top and bottom of the box clearances slightly less than the thickness of the belt around said cam whereby when the cam is turned so as to force the risers toward the respective top and bottom of said box said risers squeeze and hold said belt in the box against movement, and when said cam is turned to move said risers away from said top and bottom the belt is released for adjustment,
    said cam having an axial hole therethrough upon said shaft and said hole being substantially oval thereby to permit self-adjustment of the cam to varying thicknesses of the belt.

2. The belt adjuster specified in claim 1, and
    said yoke having oval holes in the legs thereof on said shaft corresponding to the oval hole in said cam.

3. In a box style belt adjuster
    an enlongated box having a top, a bottom and end walls and having a passage therethrough to accommodate a belt,
    a pivot shaft held in the end walls of the box
    a cam on the pivot shaft within the box,
    risers on the cam being spaced to a distance to provide between said risers and the respective top and bottom of the box clearances slightly less than the thickness of the belt around said cam whereby when the cam is turned so as to force the risers toward the respective top and bottom of said box said risers squeeze and hold said belt in the box against movement, and when said cam is turned to move said risers away from said top and bottom the belt is released for adjustment,
    a yoke having its legs on said shaft,
    a connecting element between the yoke and said cam,
    and a manipulating handle whereby said yoke is turned to turn said cam into releasing position.

4. The belt adjuster specified in claim 3, and a cap covering the passage at said yoke,
    and said manipulating element extending through said cap to the outside for manipulation.

5. The belt adjuster specified in claim 4, and
    said cap having flanges adapted to be snapped into coacting recesses on said box.

6. In a box style belt adjuster an elongated box having a top, a bottom and end walls and having a passage therethrough to accommodate a belt,
a pivot shaft held in the end walls of the box
a cam on the pivot shaft within the box,
risers on the cam being spaced to a distance to provide between said risers and the respective top and bottom of the box clearances slightly less than the thickness of the belt around said cam whereby when the cam is turned so as to force the risers toward the respective top and bottom of said box said risers squeeze and hold said belt in the box against movement, and when said cam is turned to move said risers away from said top and bottom the belt is released for adjustment,
ears extended from the box beyond said passage,
and a web supporting element between said ears spaced from said shaft.

7. In a box style belt adjuster
an elongated box having a top, a bottom and end walls and having a passage therethrough to accommodate a belt,
a pivot shaft held in the end walls of the box
a cam on the pivot shaft within the box,
risers on the cam being spaced to a distance to provide between said risers and the respective top and bottom of the box clearances slightly less than the thickness of the belt around said cam whereby when the cam is turned so as to force the risers toward the respective top and bottom of said box said risers squeeze and hold said belt in the box against movement, and when said cam is turned to move said risers away from said top and bottom the belt is released for adjustment,
spaced parallel ears extending from said end walls beyond the box in extension of said passage,
a detachable cap between said ears closing the passage behind the belt on the cam,
a yoke in the space covered by said cap,
the legs of the yoke being connected to said shaft,
means to connect said yoke to said cam for rocking said cam,
and a manipulating element extended from said yoke through said cap so as to be accessible from the outside for manipulating said yoke.

* * * * *